Dec. 9, 1941.        J. P. TARBOX ET AL        2,265,931
                    ELECTRIC DRIVE CONTROL
                    Filed July 20, 1938        2 Sheets-Sheet 1
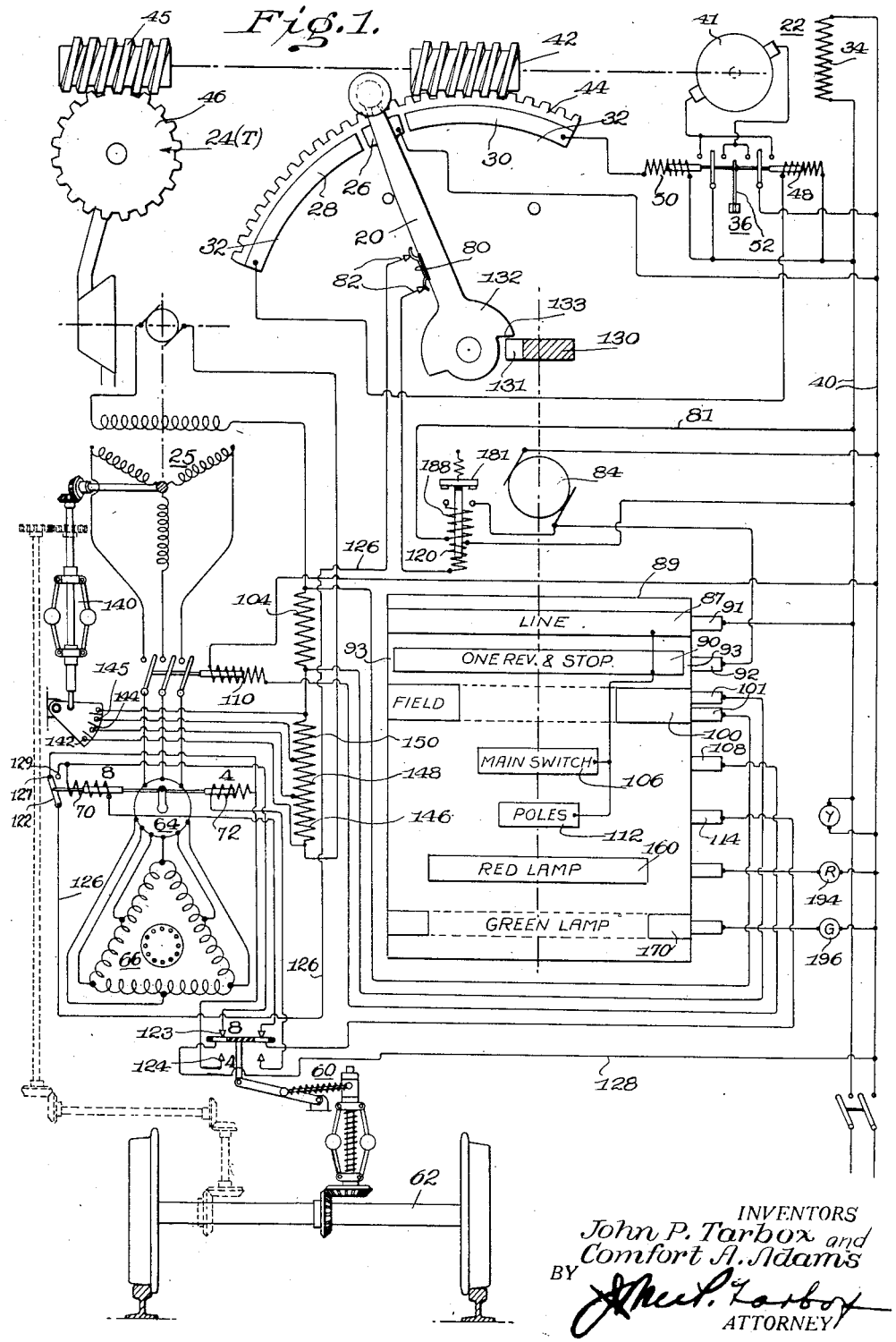
Fig. 1.
INVENTORS
John P. Tarbox and
Comfort A. Adams
BY 
ATTORNEY INVENTORS
John P. Tarbox and
Comfort A. Adams
BY
ATTORNEY Patented Dec. 9, 1941

2,265,931

UNITED STATES PATENT OFFICE 2,265,931

ELECTRIC DRIVE CONTROL

John P. Tarbox and Comfort A. Adams, Philadelphia, Pa., assignors to Edward G. Budd Manufacturing Company, Philadelphia, Pa., a corporation of Pennsylvania Application July 20, 1938, Serial No. 220,180

19 Claims. (Cl. 290—17)

This invention relates to a control system and more particularly to a semi-automatic control system for a turbo-electric vehicle drive wherein a variable speed direct drive turbo-alternator is employed in conjunction with induction motors of the changeable pole type.

In systems of the above type during starting, it is necessary in order to obtain a maximum starting torque, to use the induction motors in such a manner as to produce the greatest amount of torque, and for this purpose a maximum number of poles are employed resulting in a slower inherent speed with reference to the operating frequency. After starting and attaining some speed, the poles can be grouped to reduce the effective number thereof, one-half, or such other amount depending on the grouping, resulting in increasing the inherent speed substantially in inverse proportion to the reduction in number of effective poles.

Because of the inherent poor starting torque of induction motors, it has been found desirable to reduce the speed of the alternator supplying current thereto, thereby not only reducing the voltage, but at the same time reducing the frequency, the latter resulting in a drop in the reactance of the induction motors during starting. In such a system, the alternator is accelerated from its low speed, with increasing frequency and voltage, thereby dragging the induction motors, except for slippage, along with it. Over-excitation of the alternator is resorted to in starting to improve the efficiency of the system and the starting torque and to assure that the full power of the turbo-alternator will be absorbed by the induction motors so that the alternator and turbine will not run away from the motors, and as the speed of the motors, and of the alternator increases, the over-excitation is reduced to normal.

With the foregoing requirements in mind and others which may become apparent, an object of this invention is to provide a control of the semi-automatic type whereby through the simple operation of a manual control lever, the system will operate substantially at maximum efficiency under substantially all circumstances, and through the entire range of speeds of the vehicle.

A further object of the invention may be stated to be to provide a throttle control for a turbo-alternator induction motor drive combined with mechanism responsive to alternator speed and vehicle speed for varying the circuits of the alternator and motors to best suit the speed and torque requirements thereof.

These and other objects of the invention will appear more fully hereinafter from the following detailed description when taken in conjunction with the accompanying drawings. It is expressly understood, however, that the drawings are employed for purposes of illustration only and are not designed as a definition of the limits of the invention, reference being had for this purpose to the appended claims.

In the drawings, wherein similar reference characters indicate similar parts throughout, Fig. 1 is a diagrammatic circuit of the control system.

Figure 2:
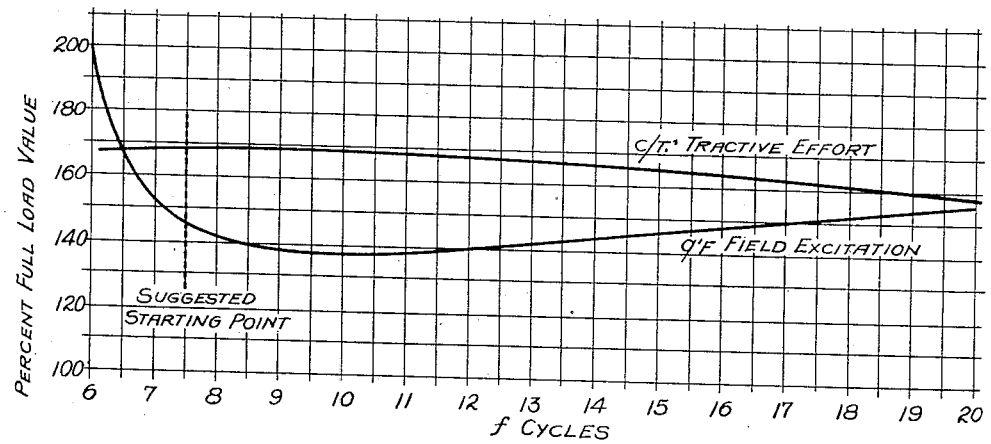
Fig. 2 is a graph showing approximate starting tractive effort for corresponding field excitation at various alternator frequencies.

Referring to the drawings, there is diagrammatically illustrated a turbine driven alternator 25, motors 66 and pole changing switches 64. A control lever indicated at 20 is adapted to control through a servo-motor 22, a turbine throttle 24, the turbine being in driving connection with the alternator 25. For this purpose the lever carries a wiper contact 26 adapted to contact either arcuate segment 28 or 30 on a pivotal follow up sector 32. The servo-motor 22 is provided with a field 34 which can be connected across the line 40, as shown, and an armature 41 connected through a spring centered magnetically controlled reversing switch 36, also connecting the armature to the line. The armature is, through a worm 42, and sector worm wheel 44 attached to the sector 32, and through a worm 45 and wheel 46, adapted to cause the sector to follow the control lever and simultaneously open or close the throttle 24 respectively. For this purpose the segments 28 and 30 are each connected to the respective solenoids 48 and 50 of the switch 36, so as to actuate the switch in one or the other of its extreme positions when the lever contact 26 contacts either segment 28 and 30 respectively. When the sector 32 has completed its follow up movement, solenoids 48 and 50 are deenergized, the reversing switch is thrown to a neutral disconnect position by reason of the centering spring 52.

While the above mechanism is adapted to control the throttle, and thereby vary the speed of the turbine over a wide range of speeds varying say from 5% of maximum to full speed, other mechanism is provided to improve the starting torque, as well as the acceleration and general operating characteristics throughout this wide variation.

For this purpose a centrifugal governor switch 60 driven from the car axle 62 is provided in conjunction with a solenoid operated switch 64 to vary the number of effective poles on the axle drive motor 66 or motors by varying the field connections thereto. The governor switch is preferably of the snap action double pole double throw type so that a circuit through one solenoid 70, or the other 72 of the pole changing switch 64 is effected at all times, the connection to one solenoid or the other depending on the speed. For example, for the range of speeds from zero to approaching one-half speed, the solenoid 70 will be in circuit to shift the switch 64 to provide, for example, an eight or twelve pole motor circuit, and for speeds higher, the solenoid 72 will be in circuit to shift the switch for a four or six pole motor circuit. It will of course be understood that this speed range may be varied but since the range of speed with increased pole arrangement is limited, the governor must act to change the circuit at a speed less than the increased pole top speed.

In order to prevent a shifting of pole connections while the turbo-alternator is functioning under load, an automatic drum controller is provided which is so interlocked with the control lever 20 that the throttle must be closed to initiate a pole change, and the throttle must remain closed until the change is completed.

For this purpose a drum 89 adapted to make one rotation and stop is provided with a series of segments adapted to make and break the proper circuits in proper sequence with each rotation thereof, and means are provided for setting the drum in initial rotation when the control handle and throttle are closed. Referring to the diagram and the control lever 20 thereon, a closed throttle contact 80 carried by the lever 20 is adapted when the throttle is closed, to complete a circuit through contacts 82 to a solenoid 120, which is also in circuit with a single pole double throw switch 122 mechanically actuated by the pole changing switch 64. The two poles 127 and 129 of this latter switch are cross connected to the solenoids 70 and 72, so that for example, when the eight pole solenoid is connected for energization by the governor switch 60, the contacted pole will be energized only if the switch is mechanically in the wrong or, for example, in the four pole position. Under such circumstances, a circuit is completed from the line 40 through the lead 128, either contact 123 or 124 and either corresponding contact 129 or 127, contacts 82 and 80, and solenoid 120, the latter being connected to the other side of the line. The solenoid actuates an armature 181, closing contacts 180 initially setting the drum controller motor 84 in operation. An electric interlock comprising a solenoid 188 in series with the initiating circuit maintains the armature 181 and contacts 180 closed until short circuited by the 355° segment 90 contacting with the brush 92, around which the solenoid 188 is bridged and by which it becomes temporarily short circuited to permit the armature 181 and contacts 180 to be broken. Thus the drum 89 is set in rotation and is caused to continue its rotation through one revolution once its rotation has started until the break 93 in the segment 90 breaks the circuit.

Rotation of the drum first breaks the field circuit of the alternator field 102 through segment 100 and brushes 101, by inserting a high resistance 104 connected to brushes 101 which resistor maintains a reduced excitation above the residual magnetism of the field. This is useful where more than one turbo-alternator unit is used and serves to provide sufficient excitation to retain them is phase which is necessary where more than one turbine is employed either acting simple or compound. After reducing the field excitation, segment 106 connected to collector ring 87 is adapted to contact with a stationary brush 108, energizing the line switch solenoid 110 from the line 40 thereby breaking the main alternator-motor circuit. Thereafter, segment 112, also connected to ring 87, contacts brush 114 energizing the car axle driven governor circuit switch 60 which if in a position differeing from that corresponding to the position of the pole changing switch 64 will cause energization of one or the other of solenoids 70 or 72 to shift the switch to the position of the greater or lesser number of poles. Further rotation of the drum deenergizes this circuit, and subsequently deenergizes the solenoid of the master control switch 110, closing its main switch and subsequently shunting the field resistance 104 to re-excite the field.

As heretofore mentioned, there is also provided an inter-lock between the control handle 20 and the drum switch, the same comprising a notched disc 130 carried by the drum switch shaft which is adapted to interlock with a notched disc 132 carried by the control handle. The notch 131 is sufficiently wide to permit the disc 132 to rotate therein when positioned in the off position, but when the drum controller is rotated to bring the notch out of alignment, the shoulder 133 engaging the peripheral surface of disc 130, prevents any operation of the control lever. Similarly, when the disc 132 is rotated into the notch 131, the drum motor is locked against any accidental turning.

As has previously been pointed out, during starting and acceleration, at least through the lower range of speeds, it is desirable to over-excite the alternator a predetermined amount to obtain maximum starting and acceleration tractive effort. For this purpose a governor 140 is provided driven either from the alternator shaft or the car axle, and through the intermediary of contacts 142, 144 and 145 is adapted to cut in resistors 146 and 148 and 150 in sequence as the speed of the alternator or car increases.

Since the characteristics of the system are such that the motors will always provide more drag torque than the turbine and its alternator can supply, the alternator speed and car speed will always bear a close relation to one another, except during starting, and in view of this circumstance, it may be preferable that the over-excitation of the field be controlled from the axle so that where starting conditions are difficult, the over-excitation will automatically be retained through a greater range of alternator speeds. However, referring to Figure 3 it will be observed that alternator and motor speed under maximum torque conditions under varying speeds always bear a close relation to one another except for slip. The motors deliver maximum tractive effort at a starting frequency of 6 to 10 cycles and increase speed closely following the alternator as it increases its speed.

While in practice, it may be found desirable to employ a continuously variable field resistor such as the well known carbon pile type in conjunction with the governor 140, so that a relationship between speed and excitation as represented by curve A is obtained, yet on the other hand a step by step approximation may be preferred employing resistors 146 and 148 and 150 so designed and connected into the circuit by the governor as to give a stepped relationship as illustrated in curve B. The approximate percent of full load torque at varying alternator speeds and car speeds is shown in curve C indicating a possible starting torque over three times full load high speed torque, or 1.7 times rated full load low speed torque since with a change to a lesser number of poles, as in high speed operation, the full load torque is approximately cut in half.

Approximate starting characteristics are illustrated in Fig. 2. For frequencies from approximately 7.5 cycles to 12 the field over-excitation may be for the greatest starting torque and in the order of 40% to 45% over normal. Any increase over 45% will be seen to give no greater starting torque. Regarding Fig. 3 with such over-excitation of 45%, as the alternator increases its speed to 7.5 cycles, the torque increases to maximum by which time the train must start for maximum tractive effort has been reached. The capacity of the alternator and turbine are so designed that at this point upon failure to start, alternator and turbine cannot run away because the load thereon increases with the frequency at a rate faster than the turbine increases its energy output.

While the operation should be clear from the foregoing description, a brief description thereof is as follows:—

In starting, the lever 20 is in the position shown, and the governor switch 60 is in the position for maximum number of poles, so that upon opening of the throttle, either from an idling or closed position by the movement of control lever 20 through the servo-motor 22, the turbine is caused to apply increasing torque to the alternator which drives the induction motors. When half car speed is reached (full turbo-alternator speed) the controller 20 is returned to the off position closing contacts 82 and 80 to complete a circuit through solenoid 120, since the governor 60 will have already shifted switch 64 to the four pole solenoid circuit because of the speed, thereby providing a circuit through contact 127. The solenoid 120 closes contacts 180 and 182 setting the drum controller in motion.

Rotation of the drum switch first cuts off the field excitation, opens the main switch 110 and then energizes the pole changing solenoid 70 to switch in the lesser number of effective poles; thereafter closes the main switch, closes the field excitation, and then as the blank space 93 in segment 90 opens the circuit, the drum stops, for current to the motor 84 is cut off. The initiating circuit was opened by the release of the armature 181 as soon as both the series solenoid 188 became shunted by the drum controller, segment 90 and brush 92 and the solenoid 120 de-energized, from switch 122 being shifted to the contact 129 by the movement of the pole changing switch.

To increase to full speed merely requires the opening of the throttle either gradually or otherwise, assuming the turbines full output is always less than the induction motors are able to absorb. Should the train strike a heavy grade which would slow the locomotive to a point below half speed and which would cause the governor 60 to shift the pole changing switch controlled thereby, then the throttle may be closed and upon closing the contacts 82 and 80 and the drum controller will be set in operation to change the pole switch 64, whereupon the locomotive may climb the grade with an increased number of poles and an increased torque when the throttle is again opened. Should the throttle be closed when the train is travelling at high speed closing contacts 80 and 82, as soon as the governor switch 60 shifts on slowing down so that the drum controller will automatically be set in operation when the proper lower speed is reached and the pole changing switch shifted to the position corresponding to the greater number of poles so as to be ready for the next start.

In practice, various signal lamps 194 and 196 operated from segments 160 and 170 may be employed to indicate the main switch position or any desired status of the circuits, and the governors 140 and 60 may be suitably combined if both driven from the axle. It will be understood of course if the governor 140 is driven from the axle, no over-excitation may be employed within the operation of the vehicle when the induction motors are connected with the lesser number of poles, unless the actual speed of the vehicle drops well within the half speed range.

Thus there is provided a novel, semi-automatic system of control of simplified form wherein but a single manual control is employed, and from which all the circuits are automatically controlled to satisfy the varying conditions of operation.

Figure 3:
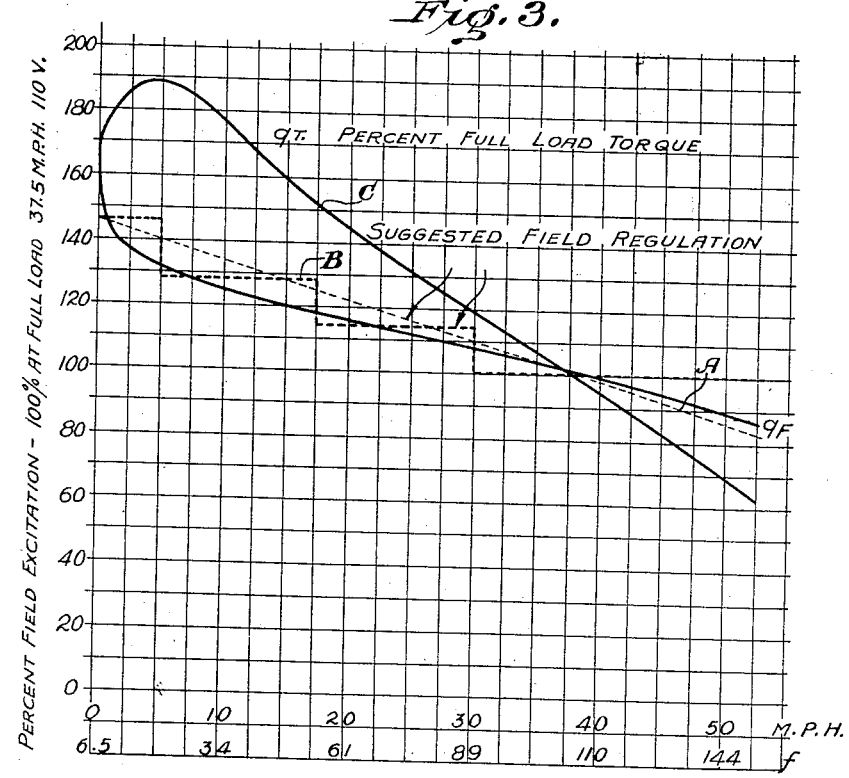
Fig. 3 is a graph illustrative of the manner of regulating the field excitation in conjunction with either alternator speed or motor speed.

It will be appreciated that the curves of Figs. 2 and 3 are merely representative particularly in so far as the frequency and speed ranges are concerned, since various ranges may be employed to suit variations in motors and alternators, as well as speeds for different types of service and driving wheel diameters.

Though a single embodiment of the invention has been illustrated and described, it is to be understood that the invention is not limited thereto but may be embodied in various electrical and mechanical equivalent forms, a few of which have been specifically set forth. As such and many other changes in construction and arrangement of parts may be made without departing from the spirit of the invention, as will be apparent to those skilled in the art, reference will be had to the appended claims for a definition of the limits of the invention.

What we claim is:

1. In a control system for a turbo-alternator induction motor vehicle drive, a turbine, an alternator direct connected thereto, a throttle for said turbine, means for exciting said alternator, a manual control for said throttle to vary the speed and power developed by the turbine, speed responsive means for varying the excitation of said alternator in inverse proportion to its speed, an induction motor connected to said alternator and means for varying the number of effective poles of said motor in response to the speed thereof.

2. In a control system for a turbo-alternator induction motor vehicle drive, a turbine, an alternator direct connected thereto, means for controlling the speed and power of said turbine, an induction drive motor connected to said alternator, means including a switch for varying the number of effective poles of said motor, and means for actuating said switch to change the number of effective poles dependent upon the motor speed and the controlling means.

3. In a control system for a turbo-alternator induction motor drive, a turbine, an alternator direct connected thereto, a throttle for said turbine, an induction drive motor connected to said alternator, switching means for varying the connections to said motor to vary the effective number of poles, electro-magnetic means for operating said switching means, a motor speed responsive switch connected in circuit with said electro-magnetic means to govern the operation of said switching means, and means in said circuit operating in response to closing of said throttle for energizing said circuit.

4. In a control system for a turbo-alternator induction motor drive, a turbine, an alternator direct connected thereto, an induction motor connected to said alternator, means for changing the number of effective poles in said induction motor, a turbine throttle control lever, and means responsive to changes in vehicle speed and to closing movement of said lever for actuating the pole changing means to vary the number of effective poles.

5. In a control system for a turbo-alternator induction motor drive, a turbine, an alternator direct connected thereto, means for exciting said alternator, an induction motor connected to said alternator, means for changing the number of effective poles in said induction motor, a turbine throttle control means, means responsive to changes in vehicle speed and to closing movement of said lever for actuating the pole changing means to vary the number of effective poles, and speed responsive means for controlling said excitation means.

6. In a control system for a turbo-alternator induction motor drive, a turbine, an alternator direct connected thereto, an induction motor connected to said alternator, a throttle control means, switching means for said alternator adapted upon closing said control means to proceed through a single set sequence of opening and closing circuits respecting said alternator, and means preventing the operation of said throttle control means while said switching means proceeds through its sequence.

7. In a control system for a turbo-alternator induction motor drive, a turbine, an alternator direct connected thereto, an induction motor connected to said alternator, a throttle control means, switching means for said alternator and interlocking means whereby said throttle control means must remain closed during switching, and said switching means must be set for transmission of power from said alternator to said induction motor to open said throttle.

8. In a control system, a throttle controller for a variable speed prime mover, a switching controller for a generator connected thereto, interlocking means therebetween, and means for operating the switching controller upon moving said throttle controller toward the closed position.

9. In a control system, a throttle controller for a variable speed prime mover, a switching controller for a generator connected thereto, a motor electrically driven by said generator, switching means for changing the motor from one inherent speed to another inherent speed for a given frequency, a speed responsive switch driven from said motor, electro-magnetic means for operating said switching means, electrical circuits including a source of energy connecting said speed responsive switch, said electro-magnetic operating means and said switching controller, whereby said switching controller and said speed responsive switch control said switching means.

10. In a control system, a throttle controller for a variable speed prime mover, a switching controller for a generator connected thereto, a motor electrically driven by said generator, switching means for changing the motor from one inherent speed to another inherent speed for a given frequency, a speed responsive switch driven from said motor, electro-magnetic means for operating said switching means, electrical circuits including a source of energy connecting said speed responsive switch, said electro-magnetic operating means and said switching controller whereby said switching controller and said speed responsive switch control said switching means, and means responsive to the closing of said throttle controller for setting said switching controller in operation.

11. In an automatic control for a turbo-alternator induction motor vehicle drive comprising a turbine drivably connected to an alternator, a throttle control for the turbine adapted to control the turbine and alternator speed through a wide range of speeds and frequencies, induction motors connected to the turbine and having a capacity to absorb all the energy of said turbine at all speeds and adapted to act as a slipping clutch with reference to said alternator, switching means for changing the number of effective poles of said motors to decrease the inherent speed and increase the torque thereof, a motor driven speed responsive switch, a controller switching device for substantially cutting off the flow of power from said alternator to said motor, temporarily, while intermediately effecting a connection through said speed responsive switch and said switching means to change the number of effective poles to correspond to the motor speed range at that instant, an auxiliary motor for operating said controller device, means associated with said turbine control to close a circuit to said auxiliary motor to initiate operation thereof upon the extreme closing of the throttle, and means associated with said controller device for closing said last named circuit during initial operation thereof and adapted to maintain said last named circuit closed through the remainder of a complete cycle of operation of said controller device.

12. In an automatic control for a turbo-alternator inducing motor vehicle drive comprising a turbine drivably connected to an alternator, a throttle control for the turbine adapted to control the turbine and alternator speed through a wide range of speeds and frequencies, induction motors connected to the turbine and having a capacity to absorb all the energy of said turbine at all speeds and adapted to act as a slipping clutch with reference to said alternator, switching means for changing the number of effective poles of said motors to decrease the inherent speed and increase the torque thereof, a motor driven speed responsive switch, a controller switching device for substantially cutting off the flow of the power from said alternator to said motor temporarily, while intermediately effecting a connection through said speed responsive switch and said switching means to change the number of effective poles to correspond to the motor speed range at that instant, an auxiliary motor for operating said controller device, means associated with said turbine control to close a circuit to said auxiliary motor to initiate operation thereof upon the extreme closing of the throttle, means associated with said controller device for closing said last named circuit during inital operation thereof and adapted to maintain said last named circuit closed through the remainder of a complete cycle of operation of said controller device and means responsive to the pole switching means and the speed responsive switch for preventing only the initial closing of said circuit when said speed responsive switch is within a range corresponding to the pole switching means position.

13. In an automatic control for a turbo-alternator induction motor vehicle drive comprising a turbine drivably connected to an alternator, a throttle control for the turbine adapted to control the turbine and alternator speed through a wide range of speeds and frequencies, induction motors connected to the turbine and having a capacity to absorb all the energy of said turbine at all speeds and adapted to act as a slipping clutch with reference to said alternator, switching means for changing the number of effective poles of said motors to decrease the inherent speed and increase the torque thereof, a motor driven speed responsive switch, a controller switching device for substantially cutting off the flow of the power from said alternator to said motor temporarily, while intermediately effecting a connection through said speed responsive switch and said switching means to change the number of effective poles to correspond to the motor speed range at that instant, an auxiliary motor for operating said controler device, means associated with said turbine control to close a circuit to said auxiliary motor to initiate operation thereof upon the extreme closing of the throttle, means associated with said controller device for closing said last named circuit during initial operation thereof and adapted to maintain said last named circuit closed through the remainder of a complete cycle of operation of said controller device, means responsive to the pole switching means and the speed responsive switch for preventing only the initial closing of said circuit when said speed responsive switch is within a range corresponding to the pole switching means position, and means for varying the excitation of said alternator in inverse proportion to the motor speed.

14. In an automatic control for a turbo-alternator induction motor vehicle drive comprising a turbine drivably connected to an alternator, a throttle control for the turbine adapted to control the turbine and alternator speed through a wide range of speeds and frequencies, induction motors connected to the turbine and having a capacity to absorb all the energy of said turbine at all speeds and adapted to act as a slipping clutch with reference to said alternator, switching means for changing the number of effective poles of said motors to decrease the inherent speed and increase the torque thereof, a motor driven speed responsive switch, a controller switching device for substantially cutting off the flow of power from said alternator to said motor temporarily, while intermediately effecting a connection through said speed responsive switch and said switching means to change the number of effective poles to correspond to the motor speed range at that instant, an auxiliary motor for operating said controller device, means associated with said turbine control to close a circuit to said auxiliary motor to initiate operation thereof upon the extreme closing of the throttle, and means associated with said controller device for closing said last named circuit during initial operation thereof and adapted to maintain said last named circuit closed through the remainder of a complete cycle of operation of said controller device, and interlocking means between said controller device and said throttle control for preventing opening of said throttle during controller operation, and controller device operation when said throttle control is open.

15. In an automatic control for a turbo-alternator induction motor vehicle drive comprising a turbine drivably connected to an alternator, a throttle control for the turbine adapted to control the turbine and alternator speed through a wide range of speeds and frequencies, induction motors connected to the turbine and having a capacity to absorb all the energy of said turbine at all speeds and adapted to act as a slipping clutch with reference to said alternator, switching means for changing the number of effective poles of said motors to decrease the inherent speed and increase the torque thereof, a motor driven speed responsive switch, a controller switching device for substantially cutting off the flow of the power from said alternator to said motor temporarily, while intermediately effecting a connection through said speed responsive switch and said switching means to change the number of effective poles to correspond to the motor speed range at that instant, an auxiliary motor for operating said controller device, means associated with said turbine control to close a circuit to said auxiliary motor to initiate operation thereof upon the extreme closing of the throttle, means associated with said controller device for closing said last named circuit during initial operation thereof and adapted to maintain said last named circuit closed through the remainder of a complete cycle of operation of said controller device, means responsive to the pole switching means and the speed responsive switch for preventing only the initial closing of said circuit when said speed responsive switch is within a range corresponding to the pole switching means position, and means for varying the excitation of said alternator from 145% normal to normal in inverse proportion to the motor speed.

16. In an automatic control for a turbo-alternator induction motor vehicle drive comprising a turbine drivably connected to an alternator, a throttle control for the turbine adapted to control the turbine and alternator speed through a wide range of speeds and frequencies, induction motors connected to the turbine and having a capacity to absorb all the energy of said turbine at all speeds and adapted to act as a slipping clutch with reference to said alternator, switching means for changing the number of effective poles of said motors to decrease the inherent speed and increase the torque thereof, a motor driven speed responsive switch, a controller switching device for substantially cutting off the flow of the power from said alternator to said motor temporarily, while intermediately effecting a connection through said speed responsive switch and said switching means to change the number of effective poles to correspond to the motor speed range at that instant, an auxiliary motor for operating said controller device, means associated with said turbine control to close a circuit to said auxiliary motor to initiate operation thereof upon the extreme closing of the throttle, means associated with said controller device for closing said last named circuit during initial operation thereof and adapted to maintain said last named circuit closed through the remainder of a complete cycle of operation of said controller device, means responsive to the pole switching means and the speed responsive switch for preventing only the initial closing of said circuit when said speed responsive switch is within a range corresponding to the pole switching means position, and means for varying the excitation of said alternator in inverse proportion to the motor speed, and means for varying the excitation of said alternator in substantially inverse proportion to the alternator and motor speeds when the motor is operating within the inherent lower speed range.

17. In a control system for a turbo-alternator induction motor vehicle drive, a turbine, an alternator direct connected thereto, an induction motor connected to said alternator, means for varying the number of effective poles of said motor to increase the torque thereof at low speed in response to the speed thereof, and means to prevent varying the number of effective poles of said motor when under load.

18. In a control system, a throttle controller for a variable speed prime mover, a switching controller for a generator connected thereto, and means for operating the switching controller upon moving said throttle controller toward the closed position only.

19. In a control system, a throttle control for a varied speed prime mover, a switching control for a generator connected thereto and means for operating the switching control upon moving said throttle control to substantially its closed position.

JOHN P. TARBOX.
COMFORT A. ADAMS.